(12) United States Patent  
Davidian

(10) Patent No.: US 8,871,101 B2  
(45) Date of Patent: Oct. 28, 2014

(54) LIQUID SEPARATOR INCLUDING VENTURI DEVICE

(75) Inventor: Steven Davidian, Chagrin Falls, OH (US)

(73) Assignee: Zebra Skimmers Corp., Solon, OH (US)

( * ) Notice: Subject to any disclaimer, the term of this patent is extended or adjusted under 35 U.S.C. 154(b) by 438 days.

(21) Appl. No.: 13/270,327

(22) Filed: Oct. 11, 2011

(65) Prior Publication Data

US 2013/0087514 A1 Apr. 11, 2013

(51) Int. Cl.
- *B01D 17/025* (2006.01)
- *B01D 17/02* (2006.01)
- B01D 17/04 (2006.01)

(52) U.S. Cl.
CPC .......... *B01D 17/0214* (2013.01); *B01D 17/045* (2013.01); *B01D 17/044* (2013.01); *B01D 2221/14* (2013.01)
USPC ...... 210/801; 210/167.02; 210/171; 210/523; 210/532.1; 210/540

(58) Field of Classification Search
CPC .......... B01D 17/0208; B01D 17/0214; B01D 17/044; B01D 17/045; B01D 2221/14
USPC .................... 210/776, 800, 801, 805, 167.01, 210/167.02, 167.04, 171, 172.1, 195.1, 519, 210/523, 532.1, 538, 540
See application file for complete search history.

(56) References Cited

U.S. PATENT DOCUMENTS

| | | | | | |
|---|---|---|---|---|---|
| 654,965 | A | * | 7/1900 | Franke | 210/540 |
| 4,980,070 | A | * | 12/1990 | Lieberman | 210/800 |
| 5,073,258 | A | * | 12/1991 | Boullain et al. | 210/172.1 |
| 5,730,872 | A | * | 3/1998 | Rhodes | 210/532.1 |
| 5,948,244 | A | * | 9/1999 | Fortier | 210/167.01 |
| 6,322,694 | B1 | * | 11/2001 | Iliadis et al. | 210/167.01 |
| 6,491,830 | B1 | * | 12/2002 | Batten et al. | 210/540 |
| 6,645,387 | B2 | * | 11/2003 | Naski et al. | 210/540 |
| 6,962,656 | B2 | | 11/2005 | Davidian et al. | |

* cited by examiner

*Primary Examiner* — Christopher Upton  
(74) *Attorney, Agent, or Firm* — Pearne & Gordon LLP

(57) ABSTRACT

First and second liquids are separated from mixtures thereof in a holding tank that holds quantities of the two liquids after they have been separated and a quantity of the mixture that has not been separated. A first transfer conduit receives a pressurized mixture of the first and second liquids which is discharged into the holding tank. A venturi passageway is located in the first transfer conduit. A liquid conductor has an entry opening positioned so that at least a portion of the entry opening is located within the quantity of the mixture that is held in the holding tank and an exit opening that is in fluid communication with the venturi passageway. The increase in the velocity of the pressurized mixture flowing through the venturi passageway and the accompanying reduced pressure causes the mixture held in the holding tank to flow through the liquid conductor into the venturi passageway.

24 Claims, 4 Drawing Sheets

LIQUID SEPARATOR INCLUDING VENTURI DEVICE

BACKGROUND OF THE INVENTION

1. Field of the Invention

The present invention relates generally to apparatus and method for separating liquids and, in particular, to apparatus and method for separating a first liquid and a second liquid from mixtures of the first liquid and second liquid employing a venturi device.

2. Discussion of the Prior Art

There can be various circumstances in which the need or preference exists for separating liquids that comprise a mixture of the liquids. Examples of such circumstances are present in a variety of industrial operations.

Many industrial operations such as grinding, milling and turning for example create heat and involve the generation of particles such as chips, shavings and fines. Liquid coolants, sometimes referred to as cutting oils, metalworking fluids or metal removing fluids, are often used in such processes to cool the working area, wash the particles away from the working area and generally facilitate the performance of the operation. The coolants also can provide lubricity for the tools performing the work and the work pieces to which the tools are applied. In addition, the coolant can provide corrosion control for the machines involved in the machining operations. In performing these functions, coolants can improve machinability, increase productivity and extend tool life.

Three classes of fluids that typically are employed as coolants include: soluble oil coolants that generally comprise an emulsion of oil and water; semi-synthetic coolants that contain both oil and a synthetic material such as a polymer; and synthetic coolants that include polymers in place of oil. Each class of these coolants has its own operational strengths and weaknesses. In any case, however, the coolants as they perform their functions can become contaminated with foreign materials which can cause the coolants to loose their effectiveness.

Examples of foreign materials that can contaminate the coolants include both solid contaminants and liquid contaminants. The solid contaminants typically comprise the chips, shavings and fines that are generated during the machining operation. The solid contaminants can provide a surface area for bacteria and fungi that foul and degrade the coolants to attach. Liquid contaminants can comprise, for example, oils that are used to lubricate components of the machine involved in the operation, such as way, slide, gear and spindle lubricants, hydraulic fluids and lubricants or other contaminants that are carried by the work piece from a previous processing operation. Such liquid contaminants generally are referred to, either individually or collectively, as tramp oils.

Typically in these industrial operations, the machining coolant is applied directly to the working area after which the coolant passes through the machine at which the machining work is being performed and is collected in a sump often located at the bottom of the machine. Typically, the coolant is pumped out of the sump and returned to the working area and in this way is constantly recirculated between the working area and the sump. As this recirculation continues, the coolant can become more and more contaminated with solid and liquid contaminants until the coolant essentially looses its effectiveness. Because the practice of discarding and replacing coolants that have become contaminated after only limited use is costly and wasteful, coolant management or maintenance programs that extend the useful life of the coolants can be implemented.

One aspect of a coolant management program can involve the separation of the solid contaminants from the coolant by settling of the solid contaminants. Settling can take place in the sump but is not particularly effective for finely divided solid particles which, if not removed from the liquid in the sump, can be returned to the working area and potentially negatively influence the operation such as by abrading important surfaces. In addition, the solid particles that settle at the bottom of the sump can provide a site for the growth of harmful bacteria particularly if the solid particles are not removed from the sump on a regular basis. Consequently, some coolant management programs make use of mechanical filters through which the coolant from the working machines is passed prior to being delivered to the sump or delivered to equipment for reconditioning the coolant by the separation of the coolant and the liquid contaminants.

As far as liquid contaminants such as tramp oils are concerned, such contaminants can degrade the coolant by, for example, destabilizing the emulsion that often forms the coolant. Because the coolant typically is heavier than the liquid contaminants and the coolant and liquid contaminants are at least somewhat immiscible with one another, separation of the liquid contaminants and the coolant can take place in the sump if a sufficient residence time for the separation to occur is provided at the sump. Thus the liquid contaminants being lighter than the coolant, will be supported or float on the coolant. To take advantage of the separation of the coolant and the liquid contaminants at the sump, the location at which coolant is withdrawn from the sump and recirculated to the working machine is located towards the bottom of the sump where substantially only the coolant is present. The floating liquid contaminants can then be removed by disk or belt skimmers or the like as part of a coolant management program.

Typically, the coolant and the liquid contaminants are not entirely immiscible or, in some cases, the coolant and the liquid contaminants will not have had sufficient time to completely separate from one another in the sump. As a consequence, the floating liquid at the top of the sump will comprise a mixture of the liquid contaminants and the coolant. In that case, it can be advantageous to recover the coolant from the mixture. This can be accomplished as part of a recycling operation by pumping the mixture to a liquid separator or coalescing apparatus where the coolant is separated from the mixture and thereafter returned to near the bottom of the sump where substantially only the coolant is present. At the same time, the liquid contaminants are removed from the separator and appropriately disposed of. In addition, rather than having the mixture of the coolant and the liquid contaminants first delivered to a sump, the coolant can be recovered by sending the mixture of coolant and liquid contaminants directly from the working machine to recycling equipment comprising a filter for removing solids and a liquid separator or coalescing apparatus at which the coolant is recovered and returned to the working machine.

BRIEF DESCRIPTION OF THE INVENTION

The following sets forth a simplified summary of examples of the present invention for the purpose of providing a basic understanding of selected aspects of the invention. The summary does not constitute an extensive overview of all the aspects or embodiments of the invention. Neither is the summary intended to identify critical aspects or delineate the scope of the invention. The sole purpose of the summary is to present selected aspects of the invention in a concise form as an introduction to the more detailed description of the embodiments of the invention that follows the summary.

In accordance with one aspect of the invention, apparatus is provided for separating a first liquid and a second liquid from mixtures of the first liquid and second liquid. The apparatus can include a holding tank that is configured to provide for the separation in the holding tank of the first liquid and the second liquid from mixtures of the first liquid and the second liquid. The holding tank also can be configured to hold a quantity of the first liquid and a quantity of the second liquid that have been separated from the mixture of the first liquid and the second liquid and to hold a quantity of the mixture of the first liquid and the second liquid. The apparatus also can include a first transfer conduit that includes an inlet opening that is configured to receive a pressurized mixture of the first liquid and the second liquid and an outlet opening that is in flow communication with the inlet opening. The first transfer conduit can be configured to discharge into the holding tank the pressurized mixture of the first liquid and second liquid that is received at the inlet opening of the first transfer conduit. A venturi passageway can be located in the first transfer conduit between the inlet opening and the outlet opening of the first transfer conduit. The venturi passageway can be configured to increase the velocity of the pressurized mixture of the first liquid and the second liquid flowing through the venturi passageway as the pressurized mixture of the first liquid and the second liquid passes from the inlet opening to the outlet opening of the first transfer conduit. The apparatus also can include a liquid conductor having an entry opening and an exit opening in fluid communication with one another. The entry opening of the liquid conductor can be arranged within the holding tank so that at least a portion of the entry opening is located within the quantity of the mixture of the first liquid and the second liquid that is held in the holding tank, and the exit opening of the liquid conductor can be arranged in fluid communication with the venturi passageway. The increase in the velocity of the pressurized mixture of the first liquid and the second liquid flowing through the venturi passageway can cause the mixture of the first liquid and the second liquid held in the holding tank to flow through the liquid conductor from the entry opening to the exit opening of the liquid conductor and into the venturi passageway.

According to another aspect, the apparatus can include liquid separating components that are located within the holding tank with the outlet opening of the first transfer conduit being arranged to deliver to the liquid separating components the pressurized mixture of the first liquid and the second liquid, together with the mixture of the first liquid and the second liquid that has flowed into the venturi passageway from the entry opening to the exit opening of the liquid conductor.

According to a further aspect, the apparatus can include a second transfer conduit that is configured to transfer from within the holding tank to the exterior of the holding tank the first liquid that has been separated from the second liquid and is held in the holding tank. In a particular embodiment of this aspect, the second transfer conduit can include a lower opening that is configured to be located within the quantity of the first liquid held in the holding tank and an upper opening that is configured to be in fluid communication with the lower opening of the second transfer conduit and exposed to the atmosphere. A discharge opening can be located between the lower opening and the upper opening of the second transfer conduit and in fluid communication with the lower opening and the upper opening of the second transfer conduit. The discharge opening can be configured to transfer the first liquid from the lower opening of the second transfer conduit through the discharge opening of the second transfer conduit to the exterior of the holding tank.

According to an additional aspect, the apparatus can include a third transfer conduit that is configured to transfer from within the holding tank to the exterior of the holding tank the second liquid that has separated from the first liquid and is held in the holding tank. In a particular embodiment of this aspect, the third transfer conduit can include a first opening, at least a portion of which is configured to be located within the quantity of the second liquid held in the holding tank and a second opening that is in fluid communication with the first opening of the third transfer conduit and is configured to transfer the second liquid from the first opening of the third transfer conduit to the exterior of the holding tank through the second opening of the third transfer conduit.

In the foregoing aspects, the first liquid can comprise primarily a liquid machining coolant and the second liquid can comprise primarily tramp oils. Additionally, the inlet opening of the first transfer conduit can be in fluid communication with mixtures of the liquid machining coolant and the tramp oils that are contained in a sump that is configured to collect mixtures of the liquid machining coolant and the tramp oils at machining facilities. Also, the discharge opening of the second transfer conduit can be configured to be in fluid communication with liquid machining coolant contained in the sump.

According to yet another aspect of the invention, a method of separating in a holding tank a first liquid and a second liquid from mixtures of the first liquid and the second liquid can include providing apparatus as described in the aspects of the invention disclosed above and passing the pressurized mixture of the first liquid and the second liquid through the venturi passageway of the first transfer conduit so as to cause the mixture of the first liquid and the second liquid contained within the holding tank to flow through the liquid conductor from the entry opening to the exit opening of the liquid conductor and into the venturi passageway of the first transfer conduit. In yet a further aspect of the invention, the method can include providing liquid separating components within the holding tank, delivering to the liquid separating components through the outlet opening of the first transfer conduit the pressurized mixture of the first liquid and the second liquid, together with the mixture of the first liquid and the second liquid that has flowed into the venturi passageway of the first transfer conduit through the liquid conductor and separating at the liquid separating components the first liquid from the second liquid in the pressurized mixture of the first liquid and the second liquid. A quantity of the first liquid and a quantity of the second liquid that have separated from the pressurized mixture of the first liquid and the second liquid, together with the mixture of the first liquid and the second liquid that has flowed into the venturi passageway of the first transfer conduit through the liquid conductor, and a quantity of a mixture of the first liquid and the second liquid can be held within the holding tank.

According to yet a further aspect of the method of the invention, the first liquid held within the holding tank can be transferred to the exterior of the holding tank through the second transfer conduit and in an embodiment of this further aspect, the method can include transferring the first liquid in the holding tank from the lower opening of the second transfer conduit through the discharge opening of the second transfer conduit to the exterior of the holding tank.

According to yet an additional aspect of the method of the invention, the second liquid held within the holding tank can be transferred to the exterior of the holding tank through the third transfer conduit and in an embodiment of this additional aspect, the method can include transferring the second liquid in the holding tank from the first opening in the third transfer conduit through the second opening in the third transfer conduit to the exterior of the holding tank.

According to still another aspect of the method of the invention, the first liquid can comprise primarily a liquid machining coolant and the second liquid can comprise primarily tramp oils. And in a particular embodiment of this aspect of the invention, the inlet opening of the first transfer conduit can be in fluid communication with mixtures of the liquid machining coolant and the tramp oils that are contained in a sump configured to collect mixtures of the liquid machining coolant and the tramp oils at machining facilities. And in even yet another embodiment of this aspect of the invention, the discharge opening of the second transfer conduit can be in fluid communication with liquid machining coolant contained in the sump.

BRIEF DESCRIPTION OF THE DRAWINGS

The foregoing and other aspects of the present invention will be apparent to those skilled in the art to which the invention relates based on the detailed descriptions of examples of aspects and embodiments of the invention that follow with reference to the accompanying drawings, wherein the same reference numerals are used in the several figures to refer to the same parts, elements and components and in which.

DETAILED DESCRIPTION

Examples of embodiments that incorporate one or more aspects of the present invention are described below with references, in certain respects, to the accompanying drawings. These examples are not intended to be limitations on the present invention. Thus, for example, in some instances, one or more examples of the present invention described with reference to one aspect or embodiment can be utilized in other aspects and embodiments. In addition, certain terminology is used herein for convenience only and is not to be taken as limiting the present invention.

Figure 1:
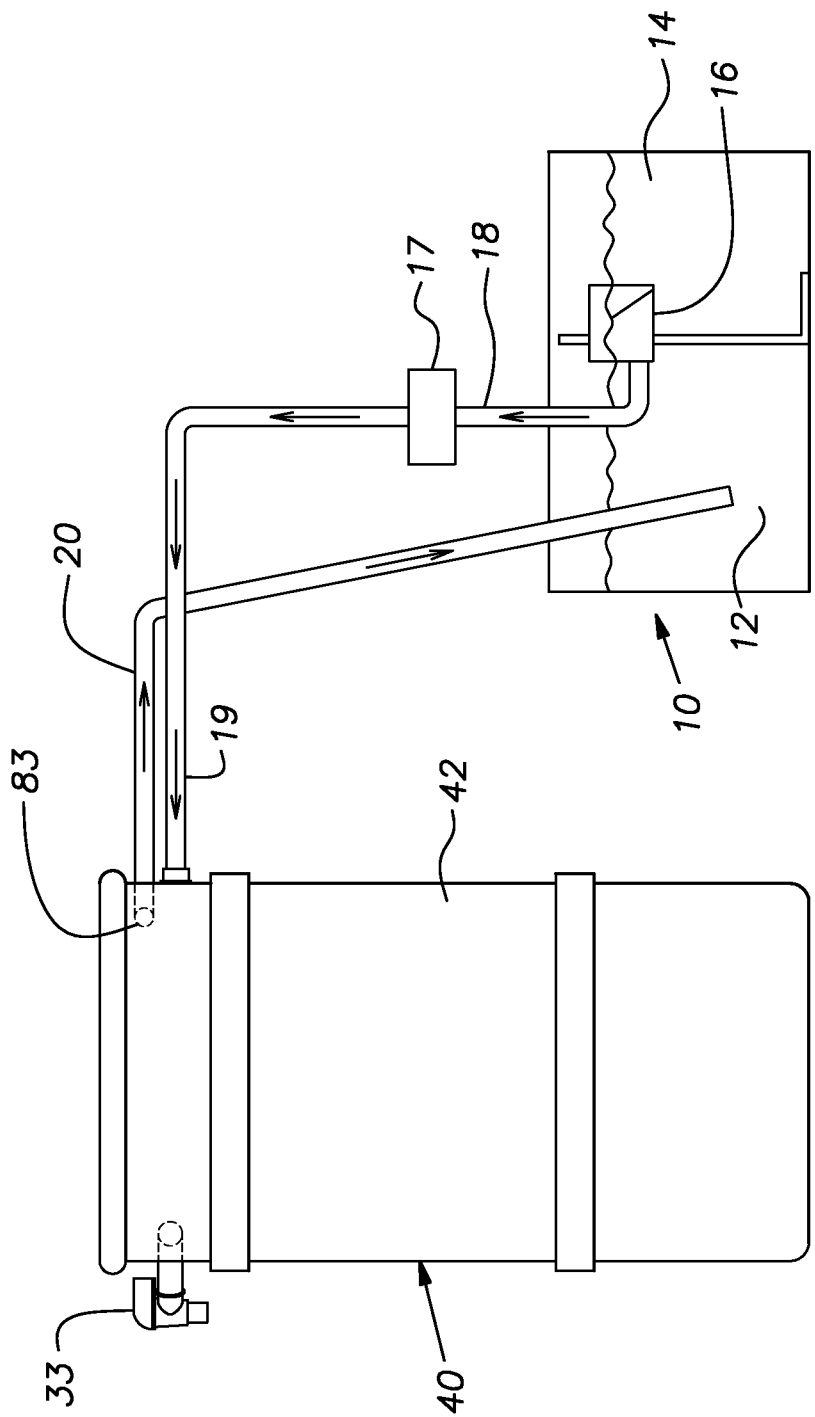
FIG. 1 is a schematic generalized elevational view, partly in section, of an example of the invention.
Figure 2:
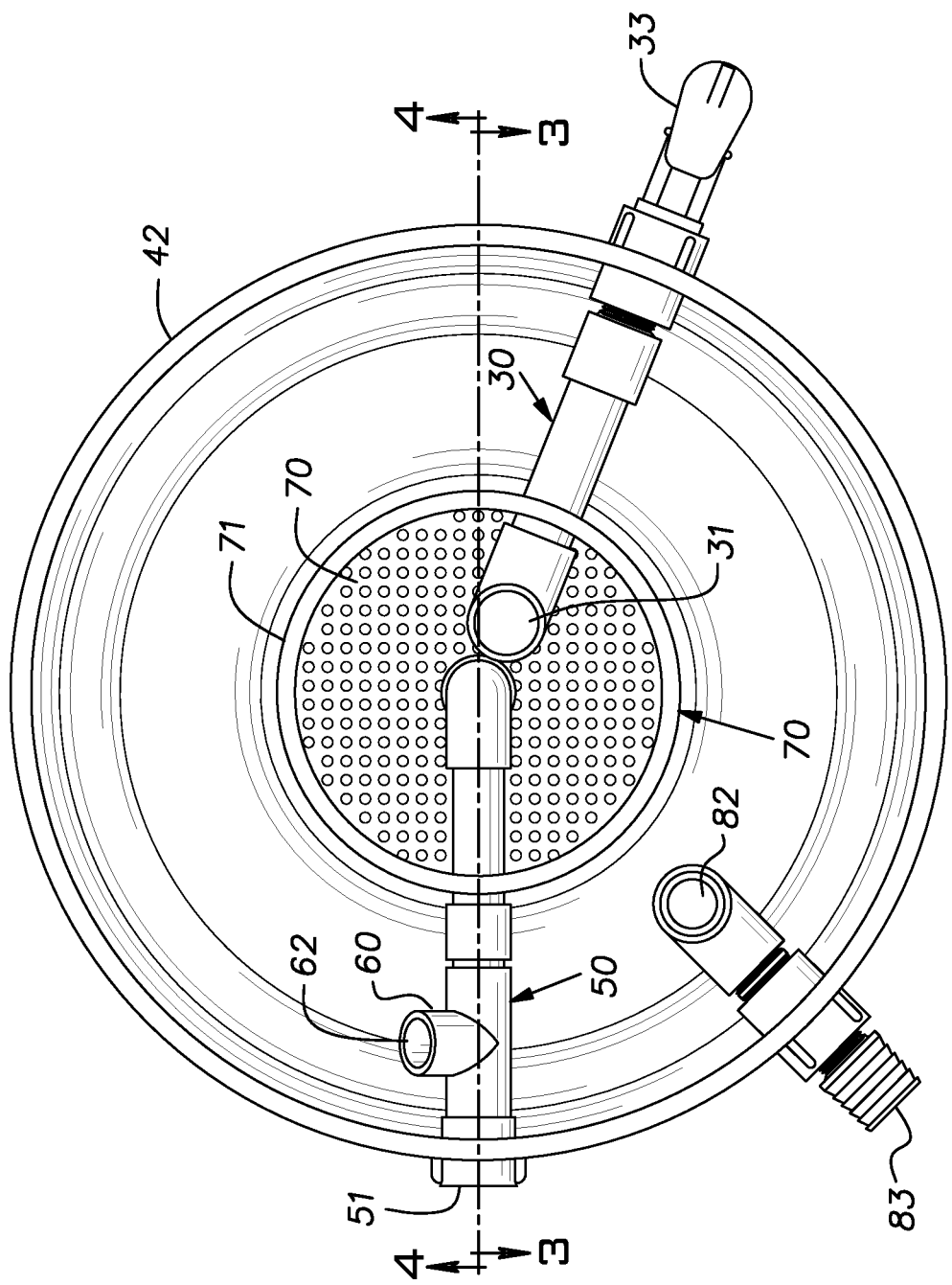
FIG. 2 is a top view of a portion of the example of the invention shown in FIG. 1.

The example of the invention illustrated in FIG. 1 comprises apparatus for separating a fluid mixture. In particular, the apparatus is configured to separate a first liquid and a second liquid from mixtures of the first liquid and the second liquid. The apparatus includes a liquid separator or coalescing apparatus, indicated generally at 40, that is in fluid communication with a sump, indicated generally at 10, that is configured to collect mixtures of liquids such as for example machining coolant and tramp oils that flow to the sump from, for example, a metal-working machine such as a milling machine or lathe not shown. The sump can be dedicated to a single metal-working machine, attend several such machines or comprise a centralized facility for an entire shop of metal-working machines.

The machining coolant and the tramp oils, typically, are discharged simultaneously from the metal-working machines to the sump 10. The machining coolant and the tramp oils are substantially immiscible with one another so that the machining coolant and the tramp oils tend to separate from one another after they are deposited in the sump 10. The sump 10 is sufficiently deep to provide sufficient time and space for the coolant to separate from the tramp oils and settle towards the bottom of the sump 10 and form a coolant layer 12 in the sump. The tramp oils because they have a lower specific gravity than the coolant form a separate layer of tramp oils 14 that is supported or floats on the coolant layer 12. Because the coolant and the tramp oils, although they are substantially immiscible, do not completely separate from one another in the sump, the layer of tramp oils 14 will contain some coolant, thereby forming a mixture of the machining coolant and the tramp oils. Many coolant management programs involve recovering the machining coolant from the mixture of the machining coolant and the tramp oils. The sump, in addition to collecting the machining coolant and tramp oils, will collect at the bottom of the sump metal particles generated at the metal-working machines in the event the fluids are not passed through a filter as the fluids flow to the sump from the metal-working machines.

As used herein, the expression "mixture" when used with reference for example to mixtures of a first liquid and a second liquid, such as mixtures of a machining coolant and tramp oils for example, is intended to be inclusive of any system of two or more liquids that is produced by mixing of the liquids. Thus, the expression "mixture" is intended to be inclusive for example of systems characterized as blends, admixtures, combinations, compounds, composites, amalgams and emulsions. Further, each of the first liquid and the second liquid that comprise a mixture may itself comprise a mixture of fluids.

Referring further to FIG. 1, a skimmer 16 is supported at the bottom of the sump 10 and is adjustably positioned so that the entry point for liquid to flow into the skimmer 16 is located within the layer of the mixture comprising tramp oils and machining coolant that floats on the coolant layer 12. A pump 17 is operatively associated with the skimmer 16 and draws through conduit 18 the mixture of tramp oils and coolant that enter the skimmer 16 and discharges the mixture of tramp oils and coolant through conduit 19 to the liquid separator 40 near the top of the separator for separation of the coolant and tramp oils as is discussed below. At the same time, coolant from the coolant layer 12 in the sump 10 is withdrawn by a pump for example, not shown, through a conduit and returned to the one or more metal-working machines for reuse at the metal-working machines.

Coolant separated at the liquid separator 40 from the mixture of coolant and tramp oils delivered to the liquid separator is returned to the sump 10 through conduit 20; and the tramp oils that have been separated at the liquid separator 40 from the mixture of the coolant and tramp oils delivered to the liquid separator 40 are removed from the liquid separator at the discharge valve 33.

The embodiment of the apparatus for separating a first liquid and a second liquid from mixtures of the first liquid and the second liquid illustrated in the figures includes a holding tank 42 that is configured to provide for the separation in the holding tank 42 of a first liquid, such as the machining coolant for example, and a second liquid, such as tramp oils for example, from mixtures of the first liquid and the second liquid. The holding tank 42 also is configured to hold a quantity of the first liquid and a quantity of the second liquid that have been separated from the mixture of the first liquid and the second liquid and to also hold a quantity of the mixture of the first liquid and the second liquid.

The apparatus also includes a first transfer conduit, indicated generally at 50, that includes an inlet opening 51 that is configured to receive a pressurized mixture of the first liquid and the second liquid and an outlet opening 52 in flow communication with the inlet opening 51 and configured to discharge into the holding tank 42 the pressurized mixture of the first liquid and the second liquid received at the inlet opening 51 of the first transfer conduit 50. As discussed above, in the embodiment of the invention illustrated in the figures, the source of the pressurized mixture of the first liquid and the second liquid can be the sump 10 from which mixtures of the machining coolant and tramp oils are delivered under the pressure supplied by pump 17 through conduits 18 and 19 to the inlet opening 51 of the first transfer conduit 50. However, mixtures of a first fluid and a second fluid that are to be delivered under pressure to and separated at the liquid separator 40 can arise in contexts other than from sumps such as sump 10.

Figure 3:
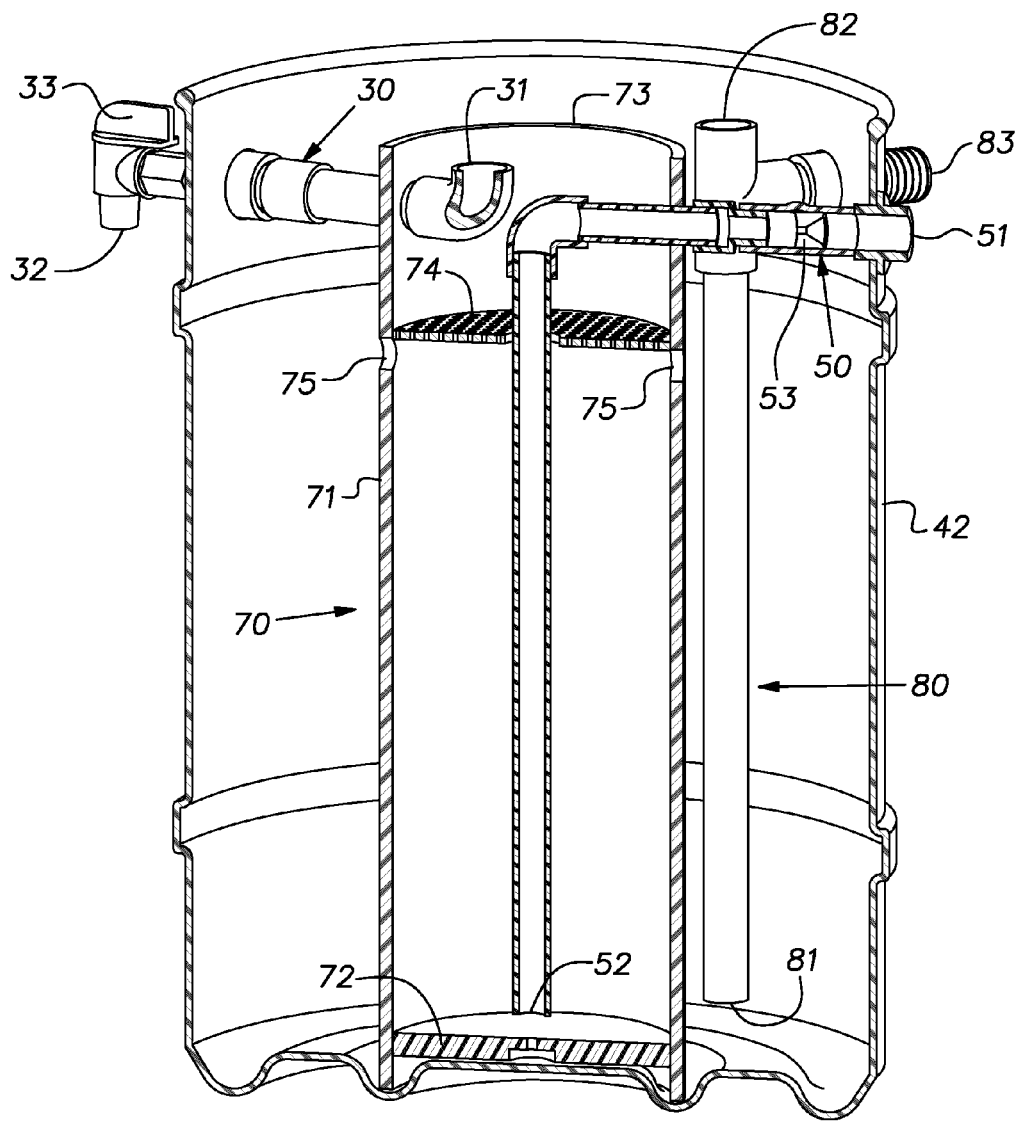
FIG. 3 is a sectional view along the lines 3-3 of FIG. 2.
Figure 4:
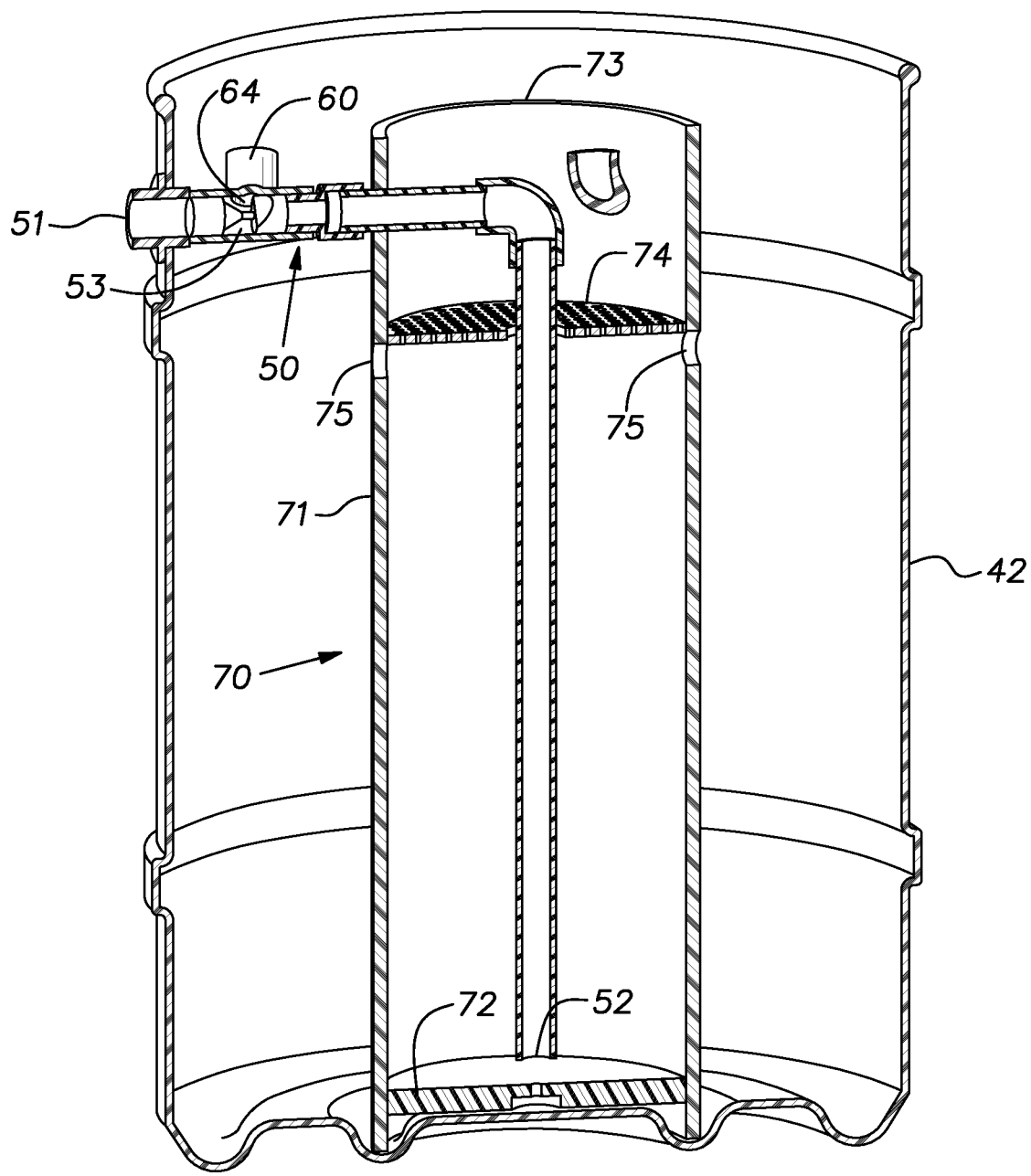
FIG. 4 is a sectional view along the lines 4-4 of FIG. 2.

In the embodiment of the invention shown in the figures, the apparatus is illustrated as including liquid separating components, indicated generally at 70, located within the holding tank 42. The outlet opening 52 of the first transfer conduit 50 is arranged, as best seen in FIGS. 3 and 4, to deliver to the liquid separating components 70 the pressurized mixture of the first liquid and the second liquid.

The liquid separating components 70 shown in the figures include a coalescing column 71 that is closed at the bottom 72, adjacent to where the outlet opening 52 of the first transfer conduit 50 is located, and is open at the top 73. Although not shown in the figures, a suitable coalescing material of a type familiar to those having ordinary skill in the art is held in place within the coalescing column 71 between the bottom 72 of the coalescing column 71 and the screen 74 located towards the top 73 of the coalescing column 71. The coalescing material acts to separate the first liquid and the second liquid from the pressurized mixture as the pressurized mixture is discharged through outlet opening 52 of the first transfer conduit 50 and rises in the coalescing column 71.

By way of example, where the first liquid comprises primarily a liquid machining coolant and the second liquid comprises primarily tramp oils, the inlet opening 51 of the first transfer conduit 50 would in fluid communication with mixtures of the liquid machining coolant and the tramp oils that are contained in the sump 10 that is configured to collect the liquid machining coolant and the tramp oils at machining facilities. As the mixture of the two fluids is transmitted through the first transfer conduit 50, is thereafter discharged through outlet opening 52 of the first transfer conduit and finally moves upwardly through the coalescing material in the coalescing column 71, the tramp oils coalesce as droplets on the surface of the coalescing material and are thereby withdrawn from the mixture of the machining coolant and the tramp oils. The droplets become larger as they merge with one another on the coalescing material until they become sufficiently large to break away from the coalescing material. The released droplets then pass upwardly through the coalescing column 71, through the screen 74 and out the top 73 of the coalescing column 71. At the same time, coolant from which the tramp oils have been extracted also passes upwardly of coalescing column 71 and exits the coalescing column at the top 73 of the column and through openings 75 in the coalescing column.

The machining coolant, because of its greater specific gravity will settle towards the bottom of the holding tank 42 where a quantity of the machining coolant will be held. The tramp oils which have a specific gravity that is not as great as the specific gravity of the machining coolant, conversely, will tend to rise in the holding tank 42 and a quantity of the tramp oils also will be held in the holding tank at the top of the machining coolant. While separators of the type that have been described can perform an effective job of separating the machining coolant and the tramp oils from mixtures of the two liquids, the separators do not completely separate the two liquids from one another and some of the mixture of the two liquids will rise through the coalescing column 71 to and out of the top 73 of the coalescing column 71. A quantity of the mixture of the first liquid and the second liquid will therefore be held in the holding tank 42 at the top of the second liquid (tramp oils) that has been separated from the mixture of the first liquid (machining coolant) and the second liquid.

A venturi passageway 53 is located in the first transfer conduit 50 between the inlet opening 51 and the outlet opening 52 of the first transfer conduit 50. The venturi passageway 53 comprises a constriction in the passageway of the first transfer conduit 50. Thereby, the venturi passageway 53 is configured to increase the velocity of the pressurized mixture of the first liquid and the second liquid flowing through the venturi passageway 53 and decrease the pressure in the venturi passageway 53 as the pressurized mixture of the first liquid and the second liquid passes from the inlet opening 51 to the outlet opening 52 of the first transfer conduit 50.

The embodiment of the apparatus of the invention shown in the figures also includes a liquid conductor 60, which can have the form of a conduit section as shown in the figures. The liquid conductor 60 includes an entry opening 62 and an exit opening 64 in fluid communication with one another. The entry opening 62 of the liquid conductor 60 is arranged within the holding tank 42 so that at least a portion of the entry opening 62 can be located within the quantity of the mixture of the first liquid (machining coolant) and the second liquid (tramp oils) that is held in the holding tank 42 at the top of the second liquid that has been separated from the mixture of the first liquid and the second liquid. And the exit opening 64 of the liquid conductor 60 is arranged in fluid communication with the venturi passageway 53, whereby the increase in the velocity of the pressurized mixture of the first liquid and the second liquid flowing through the venturi passageway 53 and the associated reduction in pressure in the venturi passageway 53 causes the mixture of the first liquid and the second liquid held in the holding tank 42 at the top of the second liquid that has been separated from the mixture of the first liquid and the second liquid to flow through the liquid conductor 60 from the entry opening 62 to the exit opening 64 of the liquid conductor 60 and into the venturi passageway 53. As a result, the mixture of the first liquid and the second liquid that flows into the venturi passageway 53 from the entry opening 62 to the exit opening 64 of the liquid conductor will be delivered to the liquid separating components 70 through the outlet opening 52 of the first transfer conduit 50 along with the pressurized mixture of the first liquid and the second liquid that enters the first transfer conduit 50 at the inlet opening 51 from the sump 10.

The embodiment of the apparatus shown in the figures also includes a second transfer conduit, indicated generally at 80, that is configured to transfer from within the holding tank 42 to the exterior of the holding tank the first liquid that has been separated from the second liquid and is held in the holding tank. As best seen in FIG. 3, the second transfer conduit 80 includes a lower opening 81 that is configured to be located within the quantity of the first liquid that has separated from the mixture of the first liquid and the second liquid and is held in the holding tank 42. An upper opening 82 of the second transfer conduit 80 is configured to be in fluid communication with the lower opening 81 of the second transfer conduit 80 and exposed to the atmosphere. A discharge opening 83 is located between the lower opening 81 and the upper opening 82 of the second transfer conduit 80 and is in fluid communication with the lower opening and the upper opening of the second transfer conduit. The discharge opening 83 is configured to transfer the first liquid from the lower opening 81 of the second transfer conduit 80 through the discharge opening 83 of the second transfer conduit to the exterior of the holding tank 42. In the embodiment of the invention illustrated in the figures, the discharge opening 83 of the second transfer conduit 80 is configured to be in fluid communication through conduit 20 with liquid machining coolant that is contained in the sump 10 as best seen in FIG. 1.

The embodiment of the invention shown in the figures also includes a third transfer conduit, indicated generally at 30, that is configured to transfer from within the holding tank 42 to the exterior of the holding tank the second liquid that has been separated from the first liquid at the liquid separating components 70 and is held in the holding tank 42. The third transfer conduit 30 includes a first opening 31, at least a portion of which is configured to be located within the quantity of the second liquid that is held in the holding tank 42. The third transfer conduit 30 also includes a second opening 32 that is in fluid communication with the first opening 31 of the third transfer conduit 30 and is configured to transfer the second liquid from the first opening 31 of the third transfer conduit 30 to the exterior of the holding tank 42 through the second opening 32 of the third transfer conduit 30. The opening and closing of the second opening 32 is controlled by the discharge valve 33.

An additional aspect of the invention concerns a method of separating in the holding tank 42 the first liquid and the second liquid from mixtures of the first liquid and the second liquid. The method includes providing the first transfer conduit 50 that includes: the inlet opening 51 configured to receive a pressurized mixture of the first liquid and the second liquid; the outlet opening 52 in flow communication with the inlet opening 51 and configured to discharge into the holding tank 42 the pressurized mixture of the first liquid and the second liquid received at the inlet opening 51; and the venturi passageway 53 located in the first transfer conduit 50 between the inlet opening 51 and the outlet opening 52 of the first transfer conduit 50 through which the pressurized mixture of the first liquid and the second liquid flows as the pressurized mixture of the first liquid and the second liquid passes from the inlet opening 51 to the outlet opening 52 of the first transfer conduit 50. The method additionally includes providing the liquid conductor 60 having an entry opening 62 and an exit opening 64 in fluid communication with one another, the entry opening 62 of the liquid conductor 60 being arranged within the holding tank 42 so that at least a portion of the entry opening 62 can be located within a quantity of a mixture of the first liquid and the second liquid that is contained in the holding tank 42, and the exit opening 64 of the liquid conductor 60 being arranged in fluid communication with the venturi passageway 53 of the first transfer conduit 50. The method includes passing the pressurized mixture of the first liquid and the second liquid through the venturi passageway 53 of the first transfer conduit 50 so as to cause the mixture of the first liquid and the second liquid contained within the holding tank 42 to flow through the liquid conductor 60 from the entry opening 62 to the exit opening 64 of the liquid conductor 60 and into the venturi passageway 53 of the first transfer conduit 50.

The method also can include providing the liquid separating components 70 within the holding tank 42 and delivering to the liquid separating components 70 through the outlet opening 52 of the first transfer conduit 50 the pressurized mixture of the first liquid and the second liquid, together with the mixture of the first liquid and the second liquid that has flowed into the venturi passageway 53 of the first transfer conduit 50 through the liquid conductor 60. The first liquid is separated from the second liquid in the pressurized mixture of the first liquid and the second liquid at the liquid separating components 70. And a quantity of the first liquid and a quantity of the second liquid that have separated from the pressurized mixture of the first liquid and the second liquid and from the mixture of the first liquid and the second liquid that has flowed into the venturi passageway of the first transfer conduit through the liquid conductor, and a quantity of a mixture of the first liquid and the second liquid is held within the holding tank 42.

The method can further include providing the second transfer conduit 80 and transferring the first liquid held within the holding tank 42 to the exterior of the holding tank through the second transfer conduit 80. The second transfer conduit 80 can include a lower opening 81 located within the first liquid contained in the holding tank 42, an upper opening 82 in fluid communication with the lower opening 81 and exposed to the atmosphere and a discharge opening 83 located between the lower opening 81 and the upper opening 82 and in fluid communication with the lower opening 81 and the upper opening 82. The method can include transferring the first liquid in the holding tank 42 from the lower opening 81 of the second transfer conduit 80 through the discharge opening 83 of the second transfer conduit 80 to the exterior of the holding tank 42. The discharge opening 83 of the second transfer conduit 80 can be in fluid communication with liquid machining coolant contained in the sump 10.

The method also can include providing the third transfer conduit 30 and transferring the second liquid held within the holding tank 42 to the exterior of the holding tank through the third transfer conduit 30. The third transfer conduit 30 can include a first opening 31, at least a portion of which is located to allow the second liquid held in the holding tank 42 to flow into the first opening 31, and a second opening 32 in fluid communication with the first opening 31. The second liquid that flows into the first opening 31 is transferred from the first opening through the second opening 32 to the exterior of the holding tank 42.

In the foregoing method, the first liquid can comprise primarily a liquid machining coolant and the second liquid can comprise primarily tramp oils. Additionally, the inlet opening 51 of the first transfer conduit 50 can be in fluid communication with mixtures of the liquid machining coolant and the tramp oils that are contained in the sump 10 that is configured to collect mixtures of the liquid machining coolant and the tramp oils at machining facilities.

While the present invention has been described above and illustrated with reference to certain embodiments thereof, it is to be understood that the invention is not so limited. Thus, as noted above, the various aspects of the present invention can have applications in contexts other than with machining operations. In addition, modifications and alterations of the aspects of the invention described herein will occur to those skilled in the art upon reading and understanding the specification, including the drawings. The present invention is intended to cover and include any and all such modifications and variations to the described embodiments that are encompassed by the following claims.

What is claimed is:

1. Apparatus for separating a first liquid and a second liquid from mixtures of the first liquid and second liquid, the apparatus including:

a holding tank configured to provide for the separation in the holding tank of the first liquid and the second liquid from mixtures of the first liquid and the second liquid and configured to hold a quantity of the first liquid and a quantity of the second liquid that have been separated from the mixture of the first liquid and the second liquid and to hold a quantity of the mixture of the first liquid and the second liquid;

a first transfer conduit including an inlet opening configured to receive a pressurized mixture of the first liquid and the second liquid and an outlet opening in flow communication with the inlet opening and configured to discharge into the holding tank the pressurized mixture of the first liquid and second liquid received at the inlet opening of the first transfer conduit;

a venturi passageway located in the first transfer conduit between the inlet opening and the outlet opening of the first transfer conduit and configured to increase the velocity of the pressurized mixture of the first liquid and the second liquid flowing through the venturi passageway as the pressurized mixture of the first liquid and the second liquid passes from the inlet opening to the outlet opening of the first transfer conduit; and a liquid conductor having an entry opening and an exit opening in fluid communication with one another, the entry opening of the liquid conductor being arranged within an upper portion of the holding tank so that at least a portion of the entry opening can be located within the quantity of the mixture of the first liquid and the second liquid held in the holding tank, and the exit opening of the liquid conductor being arranged in fluid communication with the venturi passageway, whereby the increase in the velocity of the pressurized mixture of the first liquid and the second liquid flowing through the venturi passageway can cause the mixture of the first liquid and the second liquid held in the holding tank to flow through the liquid conductor from the entry opening to the exit opening of the liquid conductor and into the venturi passageway.

2. The apparatus of claim 1 including liquid separating components located within the holding tank, the outlet opening of the first transfer conduit being arranged to deliver to the liquid separating components the pressurized mixture of the first liquid and the second liquid, together with the mixture of the first liquid and the second liquid that has flowed into the venturi passageway from the entry opening to the exit opening of the liquid conductor.

3. The apparatus of claim 2 wherein the first liquid comprises primarily a liquid machining coolant and the second liquid comprises primarily tramp oils.

4. The apparatus of claim 3 wherein the inlet opening of the first transfer conduit is in fluid communication with mixtures of the liquid machining coolant and the tramp oils that are contained in a sump configured to collect the liquid machining coolant and the tramp oils at machining facilities.

5. The apparatus of claim 2 including a second transfer conduit configured to transfer from within the holding tank to the exterior of the holding tank the first liquid that has been separated from the second liquid and is held in the holding tank.

6. The apparatus of claim 5 wherein the second transfer conduit includes:
a lower opening configured to be located within the quantity of the first liquid held in the holding tank;
an upper opening configured to be in fluid communication with the lower opening of the second transfer conduit and exposed to the atmosphere; and
a discharge opening located between the lower opening and the upper opening of the second transfer conduit and in fluid communication with the lower opening and the upper opening of the second transfer conduit and configured to transfer the first liquid from the lower opening of the second transfer conduit through the discharge opening of the second transfer conduit to the exterior of the holding tank.

7. The apparatus of claim 6 wherein the first liquid comprises primarily a liquid machining coolant and the second liquid comprises primarily tramp oils.

8. The apparatus of claim 5 including a third transfer conduit configured to transfer from within the holding tank to the exterior of the holding tank the second liquid that has separated from the first liquid and is held in the holding tank.

9. The apparatus of claim 8 wherein the third transfer conduit includes:
a first opening, at least a portion of which is configured to be located within the quantity of the second liquid held in the holding tank; and
a second opening in fluid communication with the first opening of the third transfer conduit and configured to transfer the second liquid from the first opening of the third transfer conduit to the exterior of the holding tank through the second opening of the third transfer conduit.

10. The apparatus of claim 9 wherein the first liquid comprises primarily a liquid machining coolant and the second liquid comprises primarily tramp oils.

11. The apparatus of claim 10 wherein the inlet opening of the first transfer conduit is in fluid communication with mixtures of the liquid machining coolant and the tramp oils that are contained in a sump configured to collect mixtures of the liquid machining coolant and the tramp oils at machining facilities.

12. The apparatus of claim 11 wherein the discharge opening of the second transfer conduit is configured to be in fluid communication with liquid machining coolant contained in the sump.

13. A method of separating in a holding tank a first liquid and a second liquid from mixtures of the first liquid and the second liquid including:
providing a first transfer conduit including an inlet opening configured to receive a pressurized mixture of the first liquid and the second liquid and an outlet opening in flow communication with the inlet opening and configured to discharge into the holding tank the pressurized mixture of the first liquid and the second liquid received at the inlet opening and a venturi passageway located in the first transfer conduit between the inlet opening and the outlet opening of the first transfer conduit through which the pressurized mixture of the first liquid and the second liquid flows as the pressurized mixture of the first liquid and the second liquid passes from the inlet opening to the outlet opening of the first transfer conduit;
providing a liquid conductor having an entry opening and an exit opening in fluid communication with one another, the entry opening of the liquid conductor being arranged within the holding tank so that at least a portion of the entry opening can be located within an upper portion of a quantity of a mixture of the first liquid and the second liquid that is contained in the holding tank, and the exit opening of the liquid conductor being arranged in fluid communication with the venturi passageway of the first transfer conduit; and
passing the pressurized mixture of the first liquid and the second liquid through the venturi passageway of the first transfer conduit so as to cause the mixture of the first liquid and the second liquid contained within the holding tank to flow through the liquid conductor from the entry opening to the exit opening of the liquid conductor and into the venturi passageway of the first transfer conduit.

14. The method of claim 13 including:
providing liquid separating components within the holding tank;
delivering to the liquid separating components through the outlet opening of the first transfer conduit the pressurized mixture of the first liquid and the second liquid, together with the mixture of the first liquid and the second liquid that has flowed into the venturi passageway of the first transfer conduit through the liquid conductor;
separating at the liquid separating components the first liquid from the second liquid in the pressurized mixture of the first liquid and the second liquid; and
holding within the holding tank a quantity of the first liquid and a quantity of the second liquid that have separated from the pressurized mixture of the first liquid and the second liquid, and have separated from the mixture of the first liquid and the second liquid that has flowed into the venturi passageway of the first transfer conduit through the liquid conductor, and a quantity of a mixture of the first liquid and the second liquid.

15. The method of claim 14 wherein the first liquid comprises primarily a liquid machining coolant and the second liquid comprises primarily tramp oils.

16. The method of claim 15 wherein the inlet opening of the first transfer conduit is in fluid communication with mixtures of the liquid machining coolant and the tramp oils that are contained in a sump configured to collect mixtures of the liquid machining coolant and the tramp oils at machining facilities.

17. The method of claim 14 including:
providing a second transfer conduit; and
transferring the first liquid held within the holding tank to the exterior of the holding tank through the second transfer conduit.

18. The method of claim 17 wherein the second transfer conduit includes a lower opening located within the first liquid contained in the holding tank, an upper opening in fluid communication with the lower opening and exposed to the atmosphere and a discharge opening located between the lower opening and the upper opening and in fluid communication with the lower opening and the upper opening, and the method includes transferring the first liquid in the holding tank from the lower opening of the second transfer conduit through the discharge opening of the second transfer conduit to the exterior of the holding tank.

19. The method of claim 18 wherein the first liquid comprises primarily a liquid machining coolant and the second liquid comprises primarily tramp oils.

20. The method of claim 14 including:
providing a third transfer conduit; and
transferring the second liquid held within the holding tank to the exterior of the holding tank through the third transfer conduit.

21. The method of claim 20 wherein the third transfer conduit includes a first opening, at least a portion of which is located to allow the second liquid held in the holding tank to flow into the first opening, and a second opening in fluid communication with the first opening, and the second liquid that flows into the first opening is transferred from the first opening through the second opening to the exterior of the holding tank.

22. The method of claim 21 wherein the first liquid comprises primarily a liquid machining coolant and the second liquid comprises primarily tramp oils.

23. The method of claim 22 wherein the inlet opening of the first transfer conduit is in fluid communication with mixtures of the liquid machining coolant and the tramp oils that are contained in a sump configured to collect mixtures of the liquid machining coolant and the tramp oils at machining facilities.

24. The method of claim 23 wherein the discharge opening of the second transfer conduit is in fluid communication with liquid machining coolant contained in the sump.

* * * * *